United States Patent [19]

Toda

[11] Patent Number: 4,746,077
[45] Date of Patent: May 24, 1988

[54] CONTROL DEVICE FOR A DRAG MECHANISM IN A SPINNING TYPE FISHING REEL

[75] Inventor: Junichi Toda, Sakai, Japan

[73] Assignee: Shimano Industrial Company Limited, Osaka, Japan

[21] Appl. No.: 867,017

[22] Filed: May 27, 1986

[30] Foreign Application Priority Data

May 30, 1985 [JP] Japan .................................. 60-117177
Dec. 16, 1985 [JP] Japan .................................. 60-193083

[51] Int. Cl.[4] ............................................ A01K 89/01
[52] U.S. Cl. .................................. 242/84.5 A; 242/220
[58] Field of Search ....................... 242/84.5 A, 84.5 P, 242/84.2 G, 84.51 A, 84.52 R, 220

[56] References Cited

U.S. PATENT DOCUMENTS

| 4,509,705 | 4/1985 | Councilman et al. | 242/84.5 P |
| 4,529,142 | 7/1985 | Yoshikawa | 242/84.5 A |
| 4,572,448 | 2/1986 | Ban | 242/84.5 A |
| 4,634,073 | 1/1987 | Coquelet | 242/84.5 A |

Primary Examiner—Stuart S. Levy
Assistant Examiner—Thomas R. Hannon
Attorney, Agent, or Firm—Stevens, Davis, Miller & Mosher

[57] ABSTRACT

The reel is provided with a rotary frame for winding a fishing line onto a spool and a drag mechanism for applying a resistance to rotation of the spool. The reel is further provided with a changeover control mechanism which changes over the drag mechanism between an operating state thereof and an operation releasing state in which the spool is freely rotatable.

9 Claims, 8 Drawing Sheets

CONTROL DEVICE FOR A DRAG MECHANISM IN A SPINNING TYPE FISHING REEL

FIELD OF THE INVENTION

This invention relates to a spinning type fishing reel, and more particularly to a spinning type fishing reel provided with a reel body, a rotary frame supported rotatably thereto, a spool shaft, a spool, and a drag mechanism for applying a resistance to rotation of the spool, the rotary frame rotating to wind a fishing line onto the spool.

BACKGROUND OF THE INVENTION

Generally, spinning type fishing reels, as is well-known, are classified into two types. One of them supports the spool shaft to the reel body in relation of being non-rotatable but slidable longitudinally thereof and is provided between the spool shaft and the spool with a drag mechanism for applying a rotational resistance to the spool. The other supports the spool shaft rotatably to the reel body, fixes the spool to the spool shaft, and is provided between the spool shaft and the reel body with a drag mechanism for applying a rotational resistance to the spool shaft, and in turn to the spool.

In either type, the drag mechanism applies to the spool a predetermined rotational resistance corresponding to a pulling force of a hooked fish, thereby preventing the fishing line from being subjected to tension overcoming its proof stress. The drag mechanism can adjust by use of a finger nut the rotational resistance to be applied to the spool, but the finger nut cannot carry out a quick adjustment.

Thus, the drag mechanism, for a fishing reel, applies to the spool a predetermined rotational resistance corresponding to the proof stress of the line. In this case, even when a fish bites a bait and intends to pull it, a predetermined resistance against a line pulling force is applied to the line through the drag mechanism, whereby the fish will at once put the bait out of its mouth. As a result, the problem is created in that a good catch is hindered.

SUMMARY OF THE INVENTION

An object of the present invention is to provide a spinning type fishing reel which allows the spools to rotate freely without applying thereto a rotational resistance until a fish bites a bait, and, when the fish bites the bait, applies to the line no resistance against a pulling force by the fish so as to permit a good solid bite, and after it is hooked, quickly applies a resistance to the rotation of the spool to thereby catch the hooked fish without the risk of cutting the line.

The present invention is characterized in that the spinning reel including the drag mechanism is provided with a changeover-control mechanism for changing over the drag mechanism between an operating state in which the spool is subjected to the rotational resistance by the drag mechanism and an operation releasing state in which the spool is released and freely rotates.

The drag mechanism includes the so-called front type drag mechanism which is interposed between the spool and the spool shaft and the so-called rear type drag mechanism interposed between the spool shaft and the reel body. When the front type drag mechanism is used, the spool shaft is rotatably supported with respect to the reel body, and the changeover-control mechanism comprises a lock mechanism having a lock member for locking the rotation of the spool shaft with respect to the reel body, an operating mechanism for operating the lock mechanism, and a return mechanism for restoring the lock member from the lock-releasing position of the spool shaft to the lock position thereof.

The rear type drag mechanism supports a cylindrical member rotatably to the spool shaft and is provided between the cylindrical member and the spool shaft with the drag mechanism, and the changeover-control mechanism comprises a lock mechanism having a lock member for locking the rotation of the cylindrical member with respect to the spool shaft, an operating mechanism for operating the lock mechanism, and a return mechanism which restores the lock member from the lock-releasing position of the cylindrical member to the lock position thereof.

In either case, the operating mechanism operates the drag mechanism to the operation releasing state, thereby enabling the spool to be freely rotatable. Hence, when a fish takes the bait into its mouth, the resistance against its line pulling force is reduced to allow the fish to satisfactorily bite the bait, resulting in that a good catch can be achieved.

Moreover, since the drag mechanism can rapidly be changed-over from the operation releasing state to the operating state, the fish can be hooked reliably without cutting the line.

In addition, in the present invention, the term "free rotation" means that the spool freely rotates not only in the state where the spool is not subjected to resistance against its rotation but also in the state where the spool, even when subjected to a small rotational resistance, smoothly rotates by a pulling force of the fish.

The above and further objects and novel features of the invention will be more fully apparent from the following detailed description when the same is read in connection with the accompanying drawings.

DETAILED DESCRIPTION OF THE INVENTION

Figure 1:
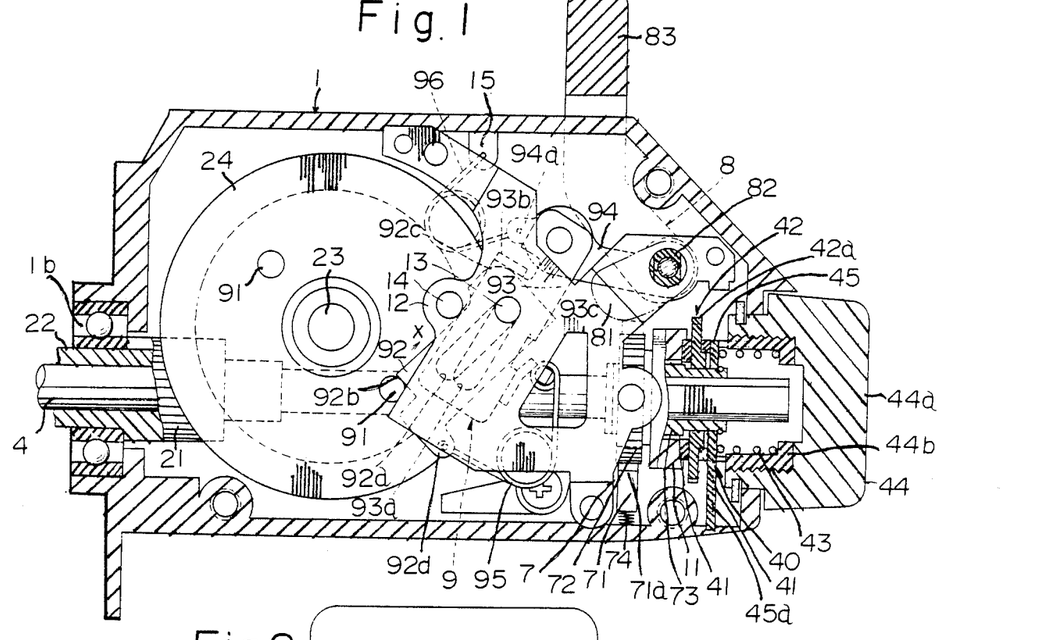
FIG. 1 is a partial longitudinal sectional side view of a first embodiment of a spinning type fishing reel of the invention.
Figure 2:
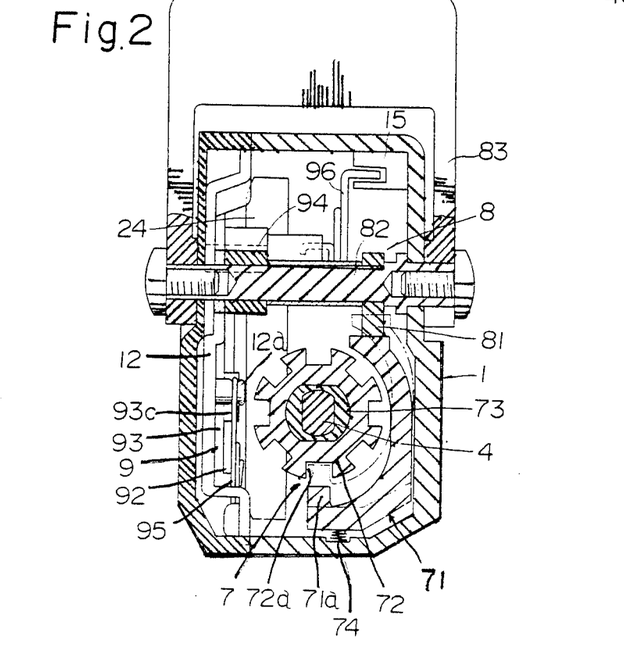
FIG. 2 is a longitudinal sectional rear view of the first embodiment in FIG. 1.

The first embodiment of the spinning type fishing reel shown in FIGS. 1 through 6 has a front type drag mechanism, which is basically constructed as follows:

A tubular drive shaft 22 having a pinion 21 is supported rotatably through a bearing 1b to a reel body 1 having at an upper portion a mounting leg 1a through which the reel is mounted on a fishing rod. A rotary frame 3 having a ball arm 31 is mounted on the outer periphery of the fore end of the drive shaft 22 to be rotatable with respect to the reel body 1. A spool shaft 4 is fitted axially movable into the center of the drive shaft 22. A spool 5 is supported onto the fore end of the spool shaft 4, a handle shaft 23 extending perpendicularly to the axis of the drive shaft 22 is supported rotatably to the side wall of the reel body 1. A master gear 24 is mounted on the handle shaft 23. Master gear 24 constitutes together with the pinion 21 a drive mechanism. Master gear 24 engages with the pinion 21. A handle 25 is mounted on a projecting portion of the handle shaft 23 projecting outwardly from the reel body 1, so that the handle 25 is rotated to drive the drive shaft 22 and rotate the rotary frame 3. Spool shaft 4 is moved axially through a reciprocation mechanism 10, thereby winding a fishing line onto the spool 5. In addition, the reel body 1, as shown in FIG. 2, comprises a box-like shaped body open at one side and a lid to close the opening of the body.

In the first embodiment shown in FIGS. 1 through 6, the spool 5 is supported rotatably to the spool shaft 4, and a drag mechanism 6 is provided between the spool 5 and the spool shaft 4. The drag mechanism applies a resistance to the rotation of spool 5. Spool shaft 4 is supported rotatably into the drive shaft 22, and between the reel body 1 and the rear end of the spool shaft 4 are provided a lock mechanism 7 having a lock member 71 for locking the rotation of spool shaft 4, an operating mechanism 8 for operating the lock mechanism 7, and a return mechanism 9 which restores the lock member 71 from the lock-releasing position to the lock position of the spool shaft 4. In the first embodiment, the lock mechanism 7, operating mechanism 8 and return mechanism 9 constitute a changeover-control mechanism which changes over the drag mechanism 6 between the operating state where the spool 5 is subjected to a rotational resistance and the operation releasing state where the operation is released to allow the spool 5 to freely rotate.

Figures 5, 6:
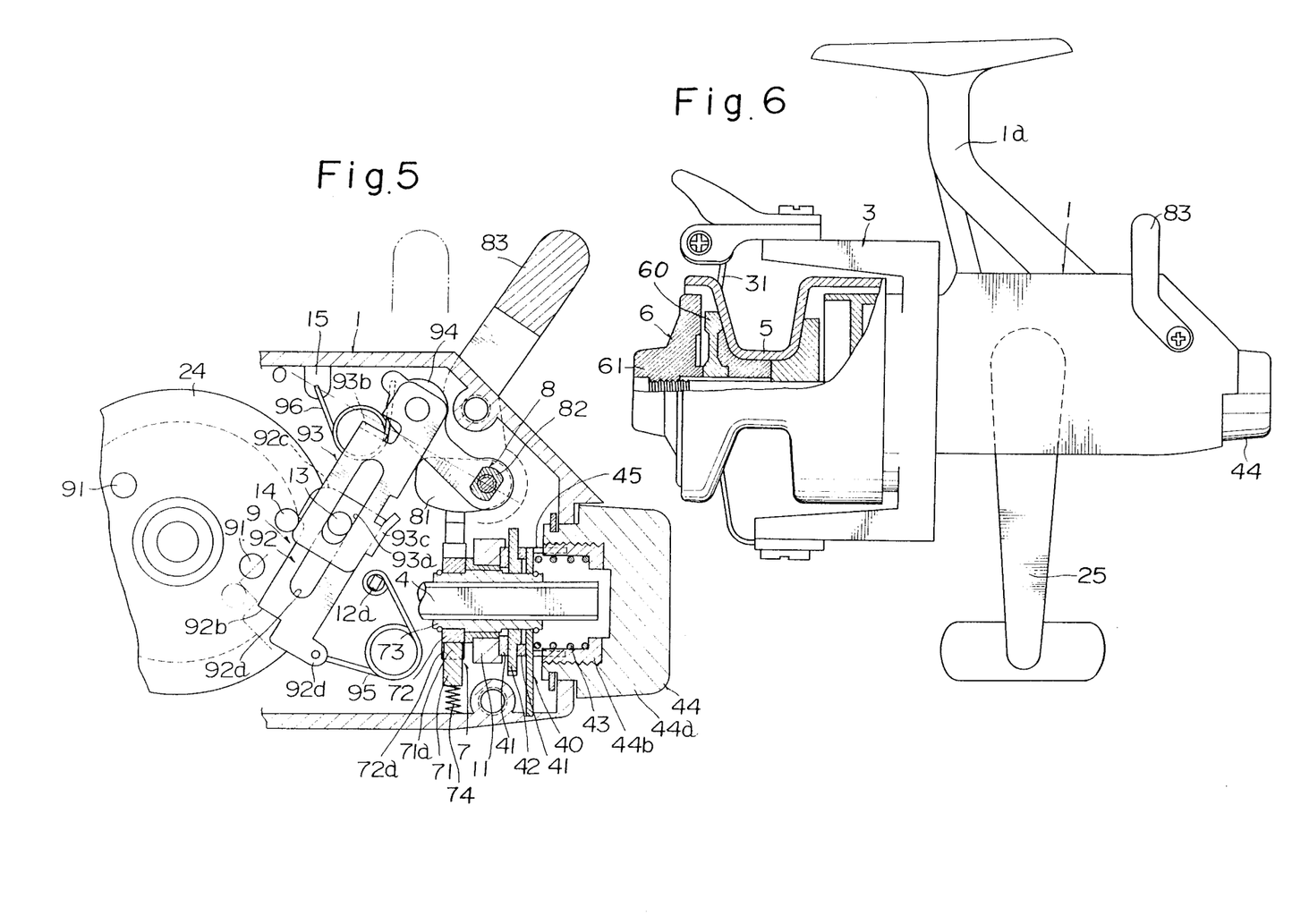
FIG. 6 is a general side view of the same.

In the above construction, the drag mechanism 6, as shown in FIG. 6, comprises a friction member 60 opposite to the fore end face of the spool 5 and an adjuster 61 which allows the friction member 60 to press-contact with the fore end face of the spool 5 and adjusts its press-contacting strength. The adjuster 61 screws with the spool shaft 4 and rotates to adjust the rotational resistance to be applied to the spool 5.

The lock mechanism 7 comprises an engaging member 72 having at its outer periphery a plurality of engaging recesses 72a and the lock member 71 having at one end an engaging pawl 71a freely engageable with one of the engaging recesses 72a, engaging member 72 is supported onto the outer periphery of a cylindrical support member 73 supported to the rear end of the spool shaft 4 such that engaging member 72 is non-rotatable relative to and axially movable relative to support member 73.

Also, the engaging member 72, as shown in FIGS. 1 and 2, is formed of a disc having at its center a non round center bore and at its outer periphery the aforesaid recesses 72a spaced circumferentially at predetermined intervals.

The lock member 71, as shown in FIG. 2, has substantially crescent shape and is disposed on the reel body 1 such that it is slidable radially of the engaging member 72. Between the lock member 71 and the inner surface of the bottom of reel body 1 is provided a spring 74 to bias the lock member 71 always in the direction of locking the spool shaft 4, in other words, toward the engaging member 72.

The support member 73 is supported rotatably to a support wall 11 projecting inwardly from the inner surface of the side wall of spool reel body 1, the spool shaft 4 is supported rotatably to the support wall 11 through the support member 73.

Hence, the engaging pawl 71a of lock member 71 engages with one engaging recess 72a, so that the spool shaft 4 is made non rotatable through the support member 73, and the spool 5 is subjected to the predetermined rotational resistance through the drag mechanism 6. Also, the engaging pawl 71a disengages from the engaging recess 72a to allow the spool shaft 4 and support member 73 to be freely rotatble, whereby the spool 5 is freely rotable regardless of the rotational resistance applied by the drag mechanism 6.

The operating mechanism 8 serves to engage or disengage the engaging pawl 71a at the lock member 71 with or from the engaging recess 72a and comprises a lever shaft 82 having a cam 81 in contact with the other end of the lock member 71, the lever shaft 82 being journalled to the opposite side walls at the reel body 1 and carrying at both axial ends the operating lever 83 as shown in FIG. 2.

It should be noted that the cam 81, as shown in FIG. 2, is separate from the lever shaft 82 and is mounted thereon such that it is non-rotatable relative thereto, but may alternatively be integral with the lever shaft 82.

The return mechanism 9 comprises kick pins 91 provided at one side surface of the master gear 24, a contactor 92 operative in contact with one kick pin 91, and an actuator 93 and an interlocking member 94 which are interposed between the contactor 92 and the lever shaft 82. The master gear 24 is rotated by the handle 24, so that the kick pin 91 pushes the contactor 92 upwardly in FIG. 1 and the operating lever 83 is returned from the free rotation position of spool 5, that is, the release state of drag mechanism 6, to the operating state thereof and the engaging pawl 71a at the lock member 71 engages with the engaging recess 72a, thereby stopping the free rotation of the spool shaft 4. In addition, two kick pins 91 provided at the master gear 24 are spaced at a phase difference of 180 degrees, but one kick pin 91 may be used.

The contactor 92 and actuator 93 are supported operatively through a support shaft 13 to a fixed member 12 fixed at the inside of the reel body 1, contactor 92 is provided with an elongate slot 92a engageable with the support shaft 13, a first abutting portion 92b abutting against the kick pin 91, a second abutting portion 92c to abut against a push projection 93b provided at the actuator 93, and a spring holder 92d. Across the spring holder 92d and a spring rest 12a provided at the fixed member 12 is provided a return spring 95 for biasing the contactor 92 in the direction of the backward movement thereof.

Figure 4:
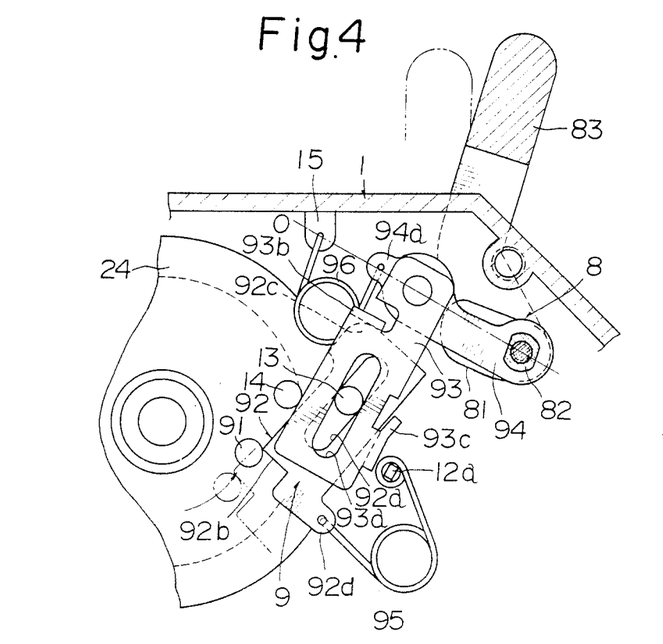
FIGS. 4 and 5 are illustrations of the operating state of the same.

The contactor 92 moves in reciprocation between its forward movement position shown in FIG. 4 and its backward movement position shown in FIG. 1. When the contactor 92 forwardly moves through the kick pin 91, the second abutting portion 92c abuts against the push projection 93b to push up the actuator 93 so as to operate the operating lever 83. After the operating lever 83 operates, the return spring 95 restores the contactor 92 into the backward movement position thereof regulated to a first position shown in FIG. 1 or a second position shown in FIG. 5. In the first position, the first abutting portion 92b at the contactor 92 enters into a rotary path of each kick pin 91 and the contactor 92 is regulated by the support shaft 13 and a regulating pin 14 provided at the fixed member 12, and is in position by the action of the return spring 95. In the second position, the first abutting portion 92b keeps away from the rotary path of the kick pin 91, and the contactor 92 is regulated by the support shaft 13 and a regulating projection 93c at the actuator 93 and is maintained in position by the return spring 95 while the actuator 93 moves forwardly.

Also, the actuator 93 is provided with an elongate slot 93a fitted to the support shaft 13. Actuator 93 also includes the aforesaid push projection 93b and regulating projection 93c. Actuator 93 is pivotably connected at one end, i.e., at the push projection 93b side, to one end of the interlocking member 94.

The end of interlocking member 94 which is connected to the actuator 93 is provided with a spring holder 94a. A torsion spring 96 is interposed between the spring holder 94a and a spring holder 15 projecting from the inner surface of the upper wall of reel body 1. Also the interlocking member 94 is supported at its root thereof to the lever shaft 82, to be non-rotatable relative thereof, thereby interlocking with the operating lever 83.

The torsion spring 96 biases the interlocking member 94 in one direction of swinging motion, and the biased direction of the interlocking member 94 is opposite to the direction of swinging motion thereof, so that the actuator 93 is stopped at the forward movement position or the return position.

The first embodiment of the spinning type fishing reel in FIGS. 1 through 6 is provided with a sub-drag mechanism 40 which applies to the spool shaft 4, and in turn the spool 5, a small resistance to an extent of lightly rotating the spool 5. The sub-drag mechanism 40 comprises a pair of friction plates 41, a washer 42 interposed therebetween, a spring 43, a locking plate 45 interposed between the spring 43 and one of the friction plates 41, and an adjuster 44. Washer 42 is supported non-rotatably-relative to the support member 73. The aforesaid one friction plate 41 is opposite to the support wall 11. Locking plate 45 and spring 43 are interposed between the other friction plate 41 and the adjuster 44, and the adjuster 44 is supported rotatably to the rear wall at the reel body 1. The adjuster 44 is rotatably operated to adjust a press-contacting force of each friction plate 41. In addition, the locking plate 45 is supported to the support member 73 to be rotatable relative thereto and axially slidable. Locking plate 45 is provided at its outer periphery with a retaining portion 45a extending radially outwardly therefrom and retained to the reel body 1 to be locked thereto, and a pair of locking projections 45b extending axially of the locking plate 45 and engaging with a screw member 44b, to be discussed in detail below, and locking it. The adjuster 44 comprises an adjusting finger nut 44a supported rotatably only to the reel body 1 and the screw member 44b screwing with the finger nut 44a so as to move only axially by the rotation thereof. The adjusting finger nut 44a rotates to allow the screw member 44b to screw forwardly or backwardly to adjust the rotational resistance applied to the spool shaft 4. In addition, the screw member 44b is provided with axially extending recesses engageable with the locking projections 45b at the locking plate 45 respectively, thereby not rotating with respect to the adjusting finger nut 44a.

The washer 42 is provided at its outer periphery with a number of teeth 42a and a second generating pawl 20 is pivoted to the fixed member 12 so that the support member 73 and spool shaft 4 rotate to move the pawl 20 against a spring 20a, whereby the pawl 20 engages with or disengages from the teeth 42a to generate sounds.

The spinning type fishing reel constructed as described above is provided with a changeover mechanism (not shown) for changing-over an anti-reverse-rotation mechanism for the rotary frame 3 between the anti-reverse-rotation stage and the release stage, the rotary frame 3 providing a bail arm 31.

Figure 3:
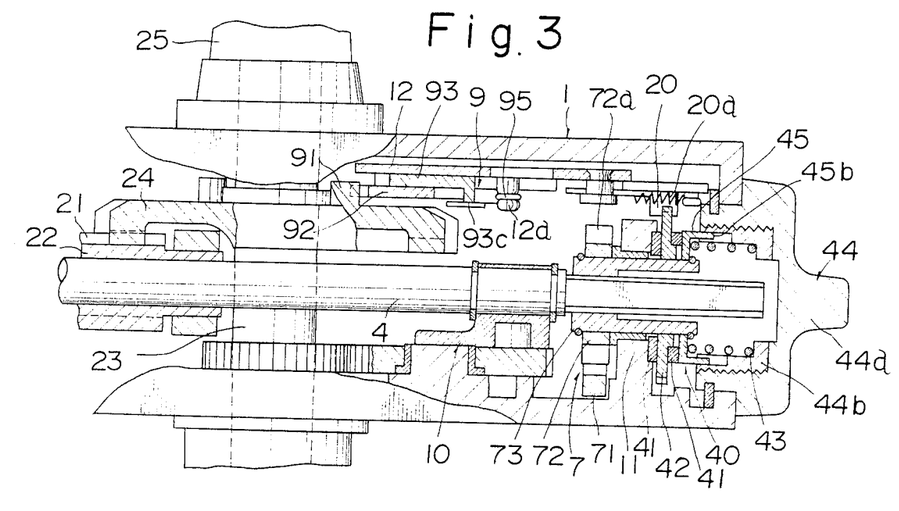
FIG. 3 is a cross-sectional bottom view of the same.

Next, explanation will be given of the operation of the aforesaid first embodiment of the fishing reel of the invention. Referring to FIGS. 1 through 3, when operating lever 83 at the operating mechanism 8 is operated from the backward movement position to the forward movement position, the engaging pawl 71a at the lock member 71 disengages from the engaging recess 72a at the engaging member 72, and the lock mechanism 7 is changed-over to the lock releasing stage. In this condition spool shaft 4 is freely rotatable, the drag mechanism 6 is in the operation releasing condition, and the spool 5 together with the spool shaft 4 is freely rotatable, the first abutting portion 92b at the contactor 92 entering into the rotary path of each kick pin 91.

When the line wound onto the spool 5 is intended to be cast, the operating lever 83 is turned from the backward movement position in FIG. 1 to the forward movement position in FIG. 5, the spool shaft 4 is locked, and the bail arm 31 is turned over to the opening side position for permitting casting of the line.

After the casting, the bail arm 31 is turned over to the closing side position and the operating lever 83 is turned to the return position in FIG. 1 to keep the spool shaft 4 freely rotatable, so that an angler waits for a fish to bite a bait.

In this case, in the first embodiment, the sub-drag mechanism 40 applies a small resistance to the rotation of the spool shaft 4 and, in turn the spool 5, to prevent the line from being pulled out due to the weight of a fishing rig or the like. Alternatively, the spool 5 together with the spool shaft 4 may be freely rotatable without being given the rotation resistance.

Next, when the fish bites the bait to apply its pulling force onto the line, the line is smoothly drawn out to result in its satisfactory bite of the fish.

Upon hooking the fish, the handle 25 is operated to rotate the master gear 24, the kick pin 91 strikes the first abutting portion 92b at the contactor 92, which moves against the return spring 95 in the direction of the arrow X in FIG. 1, and the actuator 93 moves forwardly in the direction of the arrow X following the movement of contactor 92 so as to be positioned as shown in FIG. 4. When the kick pin 91 in the above condition is released from the first abutting portion, the retained portion of the torsion spring 96 to the interlocking member 94 is inverted in the biasing direction beyond the line O indicating the inversion position of the torsion spring 96, whereby the actuator 93 itself further moves in the direction of the arrow X and then stops in the forward movement position as shown in FIG. 5. At this time the operating lever 83 is changed over to the forward movement position through the interlocking member 94 in association with the movement of actuator 93, and the lock member 71 moves toward the engaging member 72 by the spring 74 to engage the engaging pawl 71a with the engaging recess 72a, thereby putting the lock mechanism 7 in the locking stage.

Hence, the spool shaft 4 is locked and the drag mechanism 6 is put in the operating state, thereby winding the line onto the spool 5 for catching the fish.

Alternatively, the drag mechanism 6 of the so-called top type may be provided between the spool shaft 4 and a cylindrical member 50 fitted thereon so as to be used as a so-called rear type drag mechanism as shown in FIGS. 7 through 10.

A second embodiment of the spinning type fishing reel of the invention shown in FIGS. 7 through 10 supports an inwardly extending flange at one axial end of the cylindrical member 50 rotatably onto the outer periphery of a support member 73A which is non-rotatably supported to the spool shaft 4. A drag mechanism 6A is provided between the cylindrical member 50 and the support member 73A. A lock mechanism 7, operating mechanism 8 and return mechanism 9 are provided between the cylindrical member 50 and the reel body 1.

The cylindrical member 50 is supported at its outer periphery rotatably to the support wall 11. Between the cylindrical member 50 and the reel body 1 is provided a sub-drag mechanism 40 having a locking plate 45 and the engaging member 72 is supported non-rotatably relative to the outer periphery of the cylindrical member 50 the same in the first embodiment. The engaging pawl 71a at the lock member 71 engages with the engaging recess 72a at the engaging member 72 to lock the rotation of cylindrical member 50, thereby actuating the drag mechanism 6A between the cylindrical member 50 and the support member 73A.

Also, the drag mechanism 6A comprises a plurality of first and second friction plates 62 and 63, a spring 64 and an adjuster 65. The first friction plates 62 are supported to the outer periphery of the support member 73A to be non-rotatable and axially slidable relative thereto, and the second friction plates 63 are supported to the inner periphery of the cylindrical member 50 to be non-rotatable and axially slidable relative thereto. Adjuster 65 screws with the inner periphery of the cylindrical member 50, and the spring 64 is interposed between the adjuster 65 and the second friction plate 63, so that the adjuster 65 is rotated to press-cntact the first and second friction plates 62 and 63 with each other.

The lock mechanism 7, operating mechanism 8, return mechanism 9 and sub-drag mechanism 40 are basically similar in construction to the first embodiment in FIGS. 1 through 6, thus detailed description of these components is omitted in this description of the second embodiment.

Figure 7:
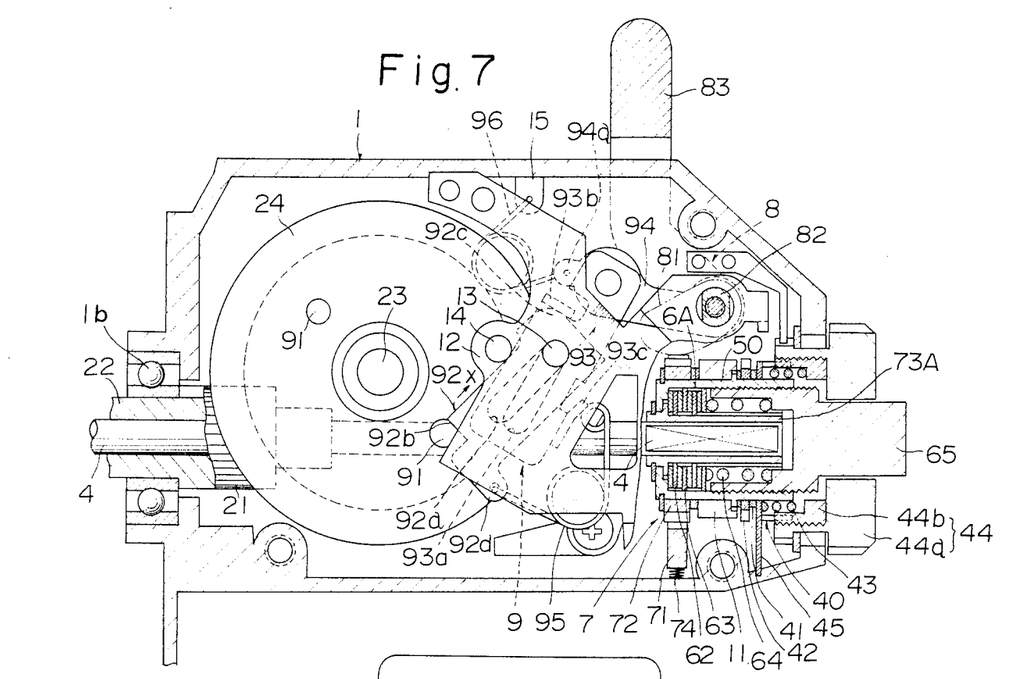
FIG. 7 is a partially longitudinal sectional side view of a second embodiment of the spinning type fishing reel of the invention.
Figure 8:
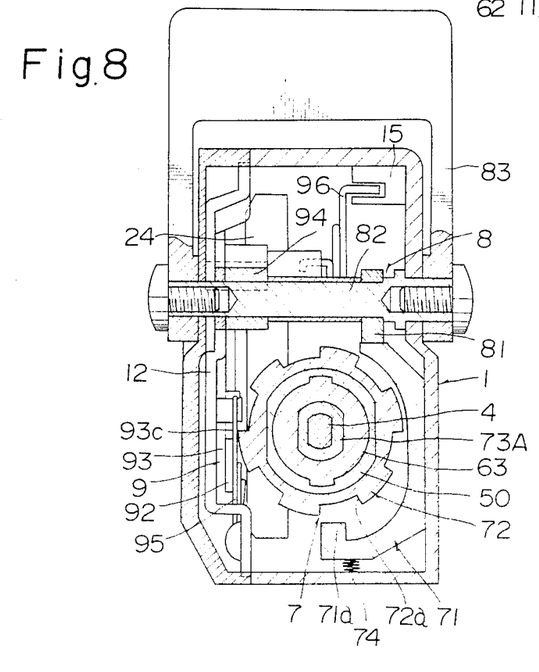
FIG. 8 is a longitudinal sectional rear view of the second embodiment in FIG. 7.
Figure 9:
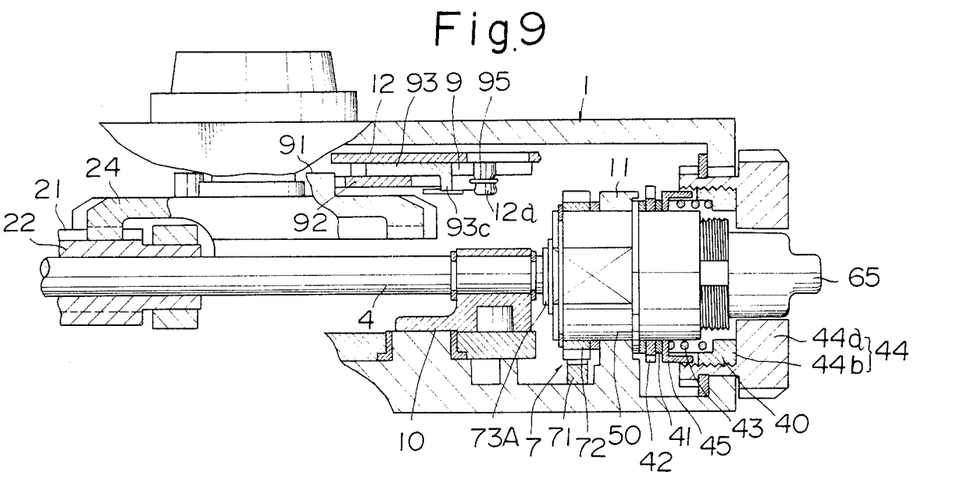
FIG. 9 is a cross sectional bottom view of the same.

Referring to FIGS. 7 through 9, when operating lever 83 is turned from its forward movement position to the backward movement position, the engaging pawl 71a disengages from the engaging recess 72a, and the lock mechanism 7 is changed-over to the lock releasing stage with the result that cylindrical member 50 is freely rotatable, the drag mechanism 6A is in the operating state, and the first abutting portion 92b at the contactor 92 enters into the rotary path of the kick pin 91.

Figure 10:
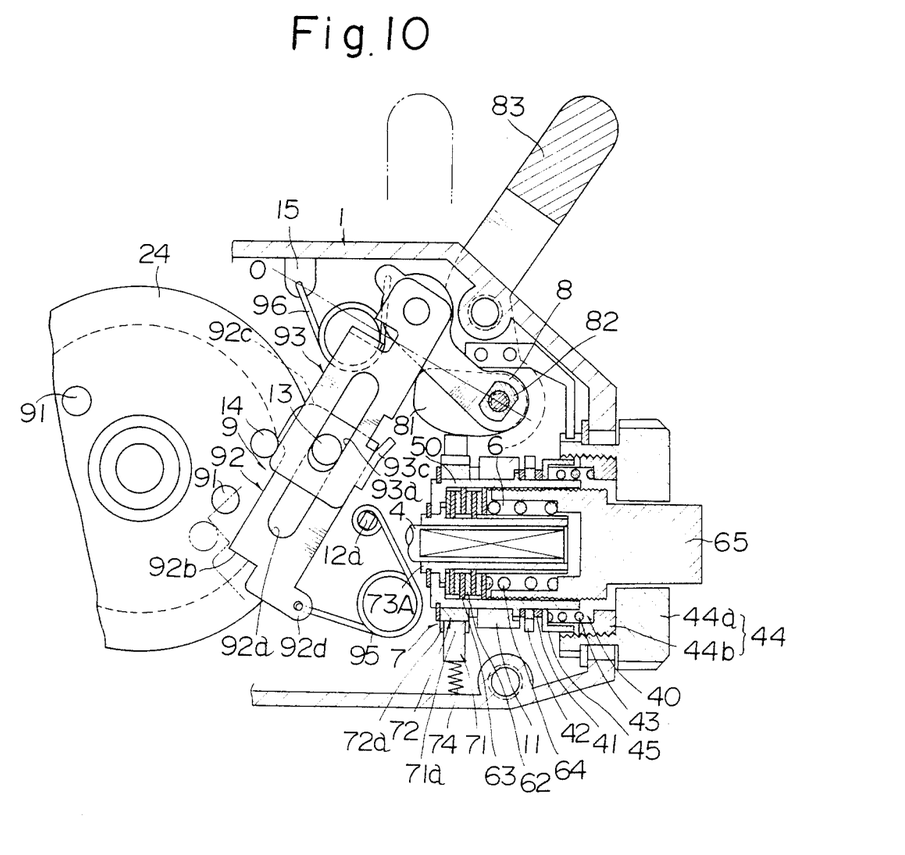
FIG. 10 is an illustration of the operating state of the same.

In the condition shown in FIGS. 7 through 9, when the handle 25 is rotated, the kick pin 91 strikes and moves the contactor 92. The actuator 93, the same as in the first embodiment, stops at forward movement position as shown in FIG. 10. The operating lever 83 is turned to the forward movement position, and the lock mechanism 7 is kept in the locking stage because the lock member 71 engages with the engaging member 72.

Hence, the cylindrical member 50 is locked to prevent its rotation and the drag mechanism 6A is in the operating condition, thereby winding the line onto the spool 5 for catching the hooked fish.

Figure 11:
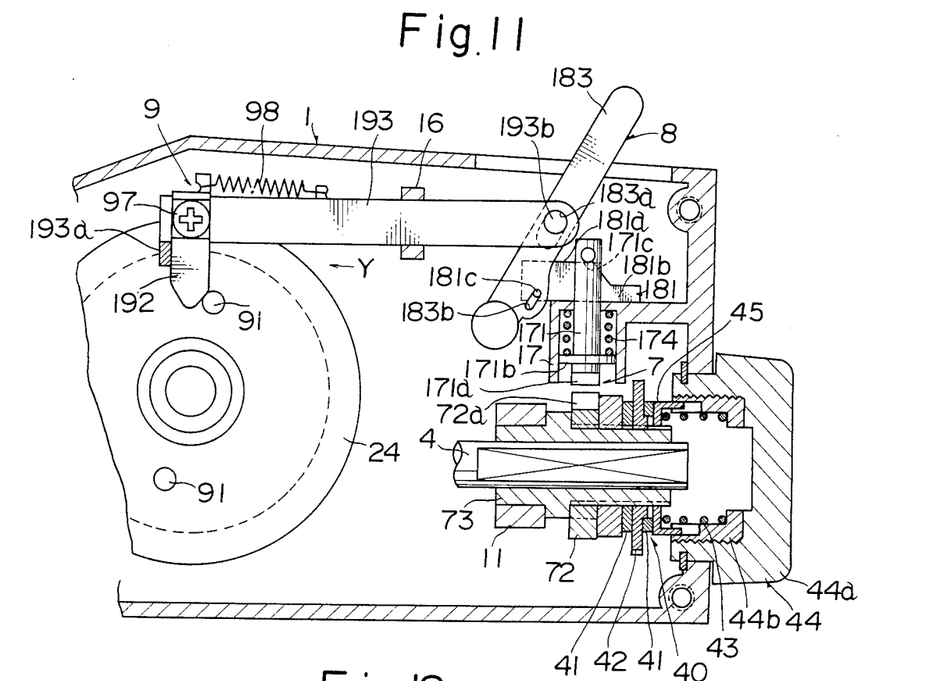
FIG. 11 is a partial longitudinal sectional side view of a third embodiment of the spinning type fishing reel of the invention.
Figure 12:
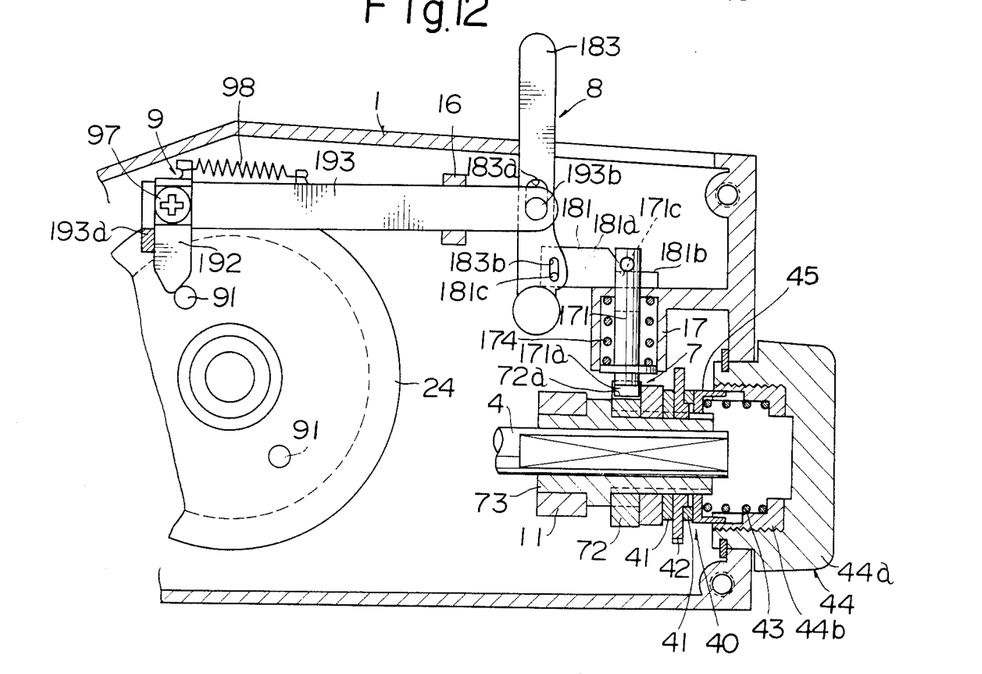
FIG. 12 is an illustration of the operating state of the third embodiment in FIG. 11.

Alternatively, an actuator 193 may be supported operatively to the reel body 1 and a contactor 192 may be pivoted to the actuator 193 as shown in FIGS. 11 and 12.

Referring to FIGS. 11 and 12, a third embodiment of the spinning type fishing reel of the invention is shown, which includes a drag mechanism 6 provided between the spool 5 and the spool shaft 4 the same as in the first embodiment shown in FIGS. 1 through 6. The reel has a rotatable spool shaft 4. Also, a support wall 16 projects from the inner surface of the one side wall at the reel body 1, and an actuator 193 is supported to the support wall 16 movably in the same direction as the spool shaft 4. A contactor 192 is pivoted swingably to the fore end of the actuator 193 through a pivot pin 97, and a spring 98 is interposed between the contactor 192 and the actuator 193 so as to bias the contactor 192 in one direction. A regulating member 193a for regulating a range of the swinging motion of the contactor 192 is provided at the actuator 193, and the actuator 193 is supported at the rear end to an operating lever 183 supported to the side wall at the reel body 1, so that a cam body 181 provided at the operating lever 183 engages with a lock member 171.

Also, a shaft 193b is provided at the rear end of the actuator 193 and an elongate slot 183a for receiving therein the shaft 193b is provided at the operating lever 183. The cam body 181 comprises a plate having a high cam face 181a and a low cam face 181b and is provided at one end with a shaft 181c. An elongate slot 183b for receiving therein the shaft 181c is provided at the operating lever 183. The lock member 171 is substantially rod-shape and is supported to a support portion 17 provided at the inner periphery of the rear wall at the reel body 1. Lock member 171 has at its utmost end an engaging portion 171a, and at its intermediate portion a spring holder flange 171b for holding a spring 174 which biases an engaging pawl 171a at the lock member 171 toward an engaging recess 72a at the engaging member 72. Lock member 171 has at its root a guide bore 171c extending axially of the lock member 171. Cam body 181 is inserted into the guide bore 171c.

FIG. 11 shows the condition in which the operating lever 183 is changed-over from its return position to its forward movement position and the lock mechanism 7 is changed-over to its release stage. The spool shaft 4 is freely rotatable, the drag mechanism 6 is in the operation releasing state, and the spool 5 together with the spool shaft 4 is freely rotatable. Also, an abutting portion at the contactor 192 enters into the rotary path of each kick pin 91.

In the condition shown in FIG. 11, when the handle 25 is operated to rotate the master gear 24, the kick pin 91 provided thereon abuts against the contactor 192, and the contactor 192, integrally with the actuator 193, moves in the direction of the arrow Y in FIG. 11. When the kick pin 91 disengages from the contactor 192 following the rotation of master gear 24, the actuator 193 stops at the return position. Also, the operating lever 183, in association with the actuator 193, is changed-over from the forward movement position to the return position. As a result lock member 171 moves toward the engaging member 72 by the spring 174 and the pawl 171a engages with the engaging recess 72a to put the lock mechanism 7 in the locking stage.

The lock mechanism 7 in the locking stage locks the rotation of the spool shaft 4 to put the drag mechanism 6 in the operating state, so that the line is wound up on the spool 5 in this state, thereby hooking the fish.

Alternatively, the return mechanism may be constructed as shown in a fourth embodiment illustrated in FIGS. 13 through 16.

The fourth embodiment incorporates the return mechanism in a space between the master gear 24 and the reel body 1.

A contactor 292 and an actuator 293 in the fourth embodiment are elongated longitudinally of the reel body 1 and disposed in the aforesaid space. Actuator 293 is pivoted at its rear end through a pin 100 to an interlocking member 294 mounted non-rotatably on a lever shaft 282 supporting an operating lever 283. Actuator 293 has at its fore end an elongate slot 293a fitted onto a guide shaft 101 projecting from the reel body 1. The contactor 292 is pivoted at its rear end to the actuator 293 through a pin 102. A spring 295 is provided between the fore end and the reel body 1, for biasing the fore end of the contactor 292 toward a kick member 291 provided at the rear side of the master gear 24.

Also, the contactor 292 is provided at its fore end with a hook 292a engageable with the kick member 291 and at its rear end with a stopper 292b which abuts against a regulation element 293b provided at the rear end of the actuator 293, thereby regulating the swinging motion of the contactor 292 caused by the spring 295.

Figure 13:
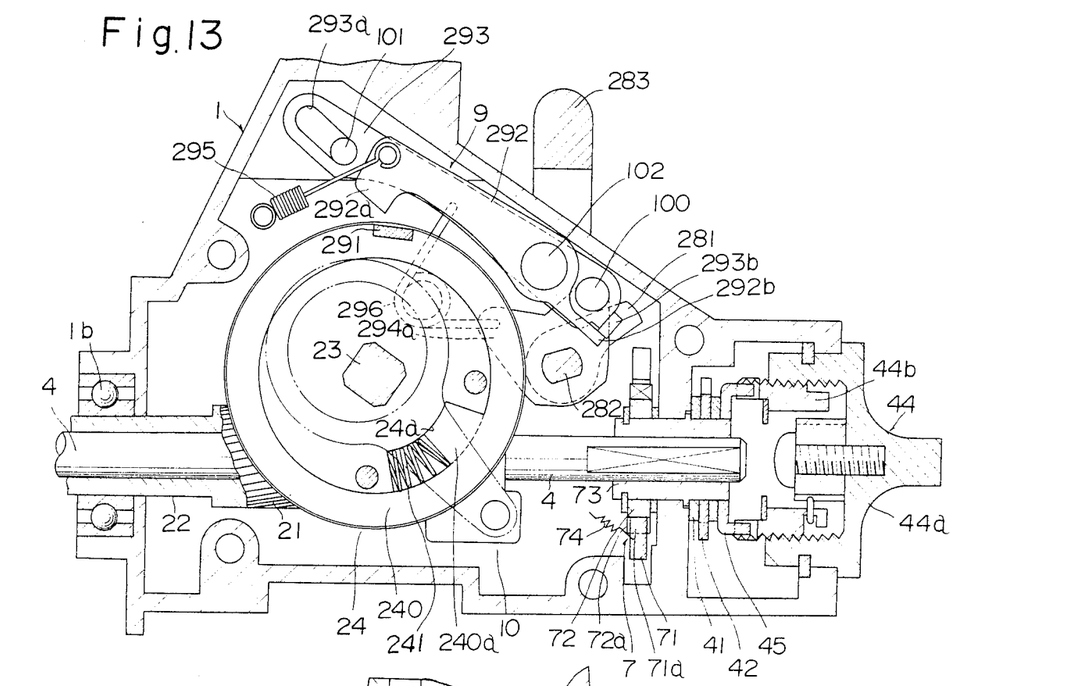
FIG. 13 is a partial longitudinal sectional side view of a fourth embodiment of the spinning type fishing reel of the invention.
Figure 14:
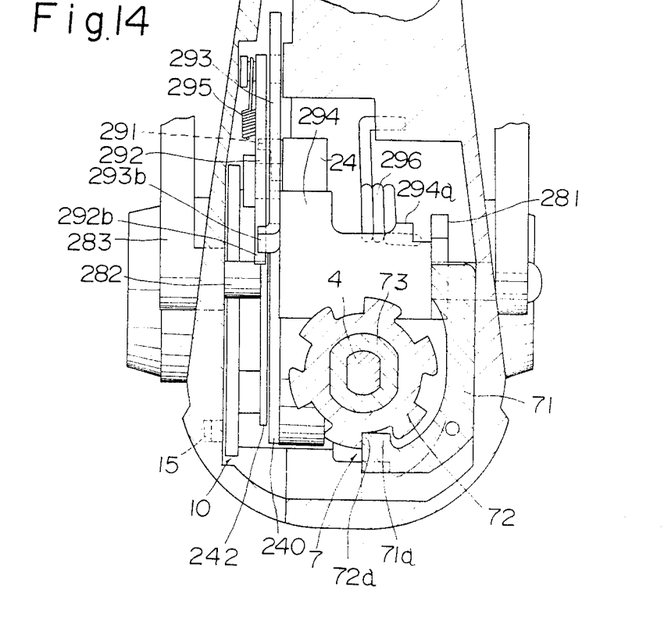
FIG. 14 is a longitudinal sectional rear view of the same.
Figure 16:
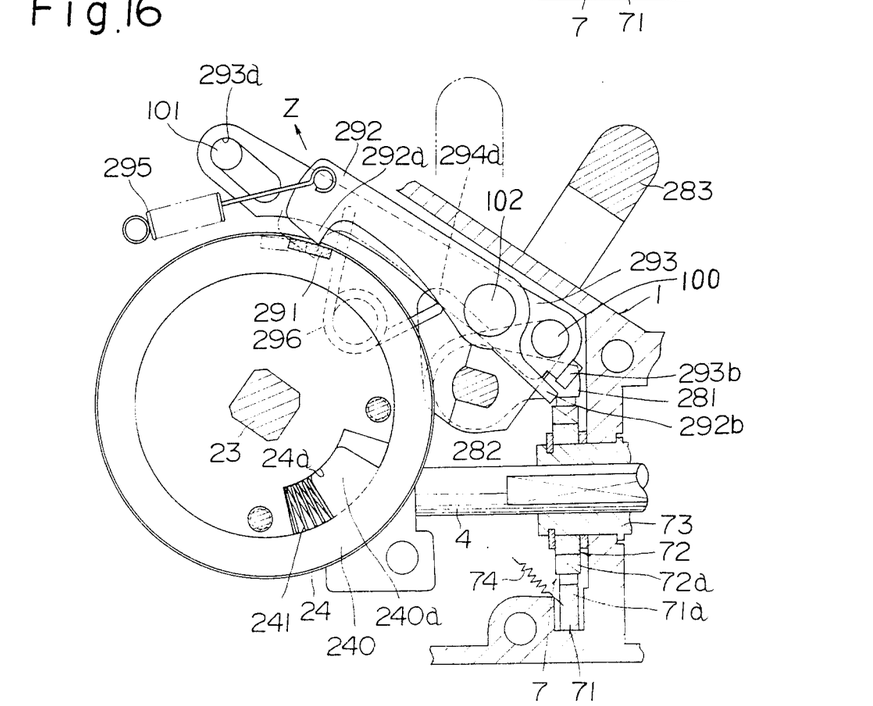

The contactor 292 and actuator 293 move in reciprocation between the forward movement position shown in FIG. 16 and the backward movement position shown in FIG. 13. In FIG. 16, the hook 292a enters in the rotary path of the kick projection 291 as shown by the chain line, and in FIG. 13, the stopper 292b abuts against the regulation element 293b to keep hook 292a out of the rotary path of the kick member 291.

The interlocking member 294 mounted on the lever shaft 282 is provided with a spring holder 294a so that a torsion spring 296 is interposed between the spring holder 294a and the inner surface of the side wall at the reel body 1.

The torsion spring 296 biases the interlocking member 294 in the one rotation direction of the lever shaft 282, so that the biasing direction of the interlocking member 294 is opposite to the direction of its swinging motion, thereby maintaining the actuator 293, and in turn the operating lever 283, in the forward movement position or the return position. In addition, the interlocking member 294 is separate from the lever shaft 282 is supported non-rotatably thereto.

In the fourth embodiment, the kick projection 291 projects from a ring-like control plate 240 separate from the master gear 24.

The control plate 240 is supported circumferentially movably to the master gear 24, and at the rear surface thereof is provided a slot 24a in a circular arc. A return spring 241 is interposed between one end face of the slot 24a and a spring rest 240a at the contro plate 240. Control plate 240 is biased reversely to the normal rotation direction of the master gear 24. In addition, the control plate 240 is movable with respect to the master gear 24 in a range of the slot 24a and a lock plate 242 is fixed to the outside of the control plate 240 through set screws, thereby holding the control plate 240 to the master gear 24.

It should be noted that the fourth embodiment is provided at the lever shaft 282 with a cam body 281 the same as in the first embodiment, and the lock mechanism 7 operates in association with the cam body 281 the same as in the first embodiment, thus explanation of these components is omitted with respect to the fourth embodiment.

Also, a sub-drag mechanism 40 used in the fourth embodiment is the same as that in the first embodiment, whereby its description is omitted.

In the fourth embodiment, the operating lever 283 is operated from the backward movement position in FIG. 16 to the forward movement position in FIG. 13 to actuate or release the drag mechanism 6 the same as in the first embodiment.

FIG. 13 shows the condition in which the engaging pawl 71a of the lock member 71 at the lock mechanism 7 engages with the engaging recess 72a at the engaging member 72, so that the drag mechanism 6 is changed-over to the forward movement position, with hook 292a at the contactor 292 leaving the rotary path of the kick member 291. From this condition, the operating lever 283 is turned clockwise in FIG. 13, whereby the cam body 281 moves to disengage the engaging pawl 71a at the lock member 71 from the engaging recess 72a. Hence, the spool shaft 4 and spool 5 are freely rotatable, at which time the hook 292a at the contactor 292, as shown by the chain line in FIG. 16, enters into the rotary path of the kick member 291.

In this condition, when the kick member 291 is in the moving path of the hook 292a and the hook 292a strikes the kick member 291, the control plate 240 having the kick member 291 rotates clockwise in FIG. 13 against the spring 241 with respect to the master gear 24, whereby the kick member 291 moves from the position shown by the chain line to that shown by the solid line in FIG. 16. Therefore, the operating lever 283 ensures its changeover to the forward movement position regardless of the position of the kick member 291. In addition, the control plate 240 returns by a restoring force of the spring 241 after the kick member 291 leaves the hook 292a.

Figure 15:
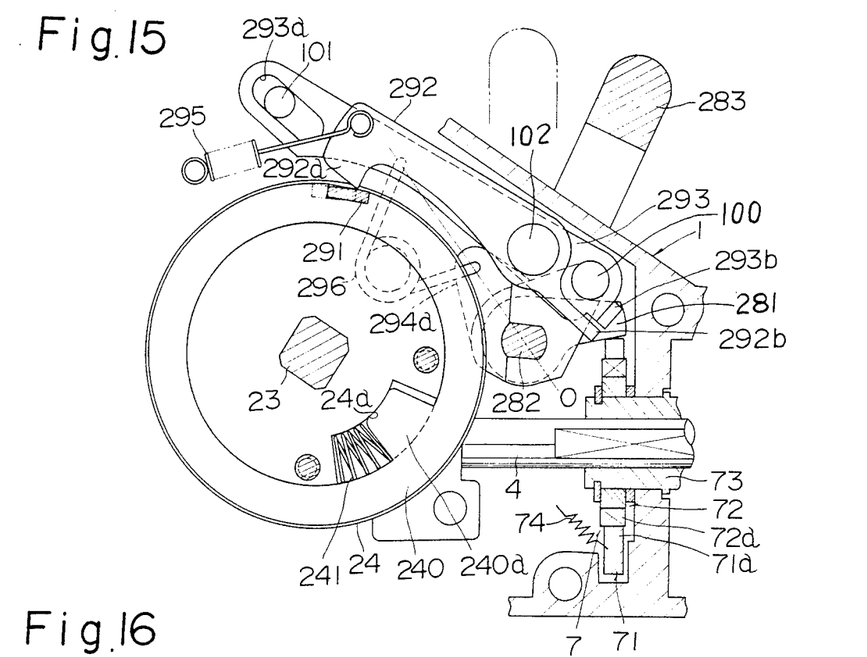
FIGS. 15 and 16 are illustrations of the operating state of the same.

In the condition in which the contactor 292 is positioned as shown in FIG. 16 so that the drag mechanism 6 is released, when the handle is operated to rotate the master gear 24 counterclockwise in FIG. 16, the kick member 291 abuts against the hook 292a to move the contactor 292 in the direction of the arrow Z in FIG. 16, whereby the actuator 293 also moves in the same direction. As shown in FIG. 15, when the kick member 291 is released from contact with the contactor 292, the retained portion of the torsion spring 296 to the interlocking member 294 moves beyond the inversion position O and the biasing direction of the torsion spring 296 is inverted, whereby the actuator 293 further moves by itself in the direction of the arrow Z and then stops at the forward movement position. At this time, the lever 283 in association with the actuator 293 returns to the forward movement position and the lock member 71 moves toward the engaging member 72 by the spring 74 so that the engaging pawl 71a engages with the engaging recess 72a. Hence, the spool shaft 4 is locked to put the drag mechanism 6 in the operating state.

Incidentally, the forth embodiment has the drag mechanism 6 of the front type the same as in the first embodiment, which drag mechanism may alternatively be provided between the spool shaft 4 and the cylindrical member 50 sleeved thereon as shown in the second embodiment.

Also, the changeover control mechanism in the above described embodiments needs only to serve to change over the drag mechanism 6 between the operating state and the release state.

Alternatively, the return mechanism 9 may not be automatic, but may be manually operated by operating, for example, the operating lever 83 or 183. In this case, the operating mechanism 8 is used also as the return mechanism 9, in which the automatic return mechanism may be omitted.

Also, the contactors 92 and 192 may alternatively be integral with the actuators 93 and 193 respectively. However, the contactors 92 and 192 are operative with respect to the actuators 93 and 193 as in the above described embodiments, so that even when the kick pins 91 and 191 are positioned to abut against the contactors 92 and 192, the operating levers 83 and 283 can be changed-over to the forward movement position thereof.

The lock mechanism 7, operating mechanism 8 and return mechanism 9, when in use, are not particularly defined or limited as to the constructions thereof.

Furthermore, the sub-drag mechanism 40 is not indispensable.

Although several embodiments have been described, they are merely exemplary of the invention and not to be construed as limiting, the scope of the invention being defined solely by the appended claims.

What is claimed is:

1. A spinning type fishing reel comprising:
   a reel body,
   a rotary frame supported rotatably to said reel body,
   a spool shaft,
   a spool supported on said shaft,
   a drag mechanism for applying a resistance against rotation of said spool,
   a changeover control mechanism for changing over said drag mechanism between an operating state in which said spool is subjected to a rotational resistance applied by said drag mechanism and an operation releasing state in which said operating state of said drag mechanism is released to enable said spool to be freely rotatable, and
   a return mechanism which, when said drag mechanism is released from said operating state, automatically restores said changeover control mechanism from a condition causing said drag mechanism to occupy said operation releasing state to a condition causing said drag mechanism to occupy said operating state following rotation of said rotary frame.

2. A spinning type fishing reel according to claim 1, wherein said drag mechanism is disposed between said spool and said spool shaft, said spool shaft being supported rotatably relative to said reel body, said changeover control mechanism being provided with a lock mechanism having a locking member for locking rotation of said spool shaft with respect to said reel body and an operating mechanism for operating said lock mechanism, and said return mechanism restores said locking member from a lock releasing position of said spool shaft to a lock position thereof.

3. A spinning type fishing reel according to claim 1, further comprising a cylindrical member supported rotatably on said spool shaft, said drag mechanism being disposed between said spool shaft and said cylindrical member, said changeover control mechanism being provided with a lock mechanism having a locking member for locking rotation of said cylindrical member with respect to said spool shaft and an operating mechanism for operating said lock mechanism, and said return mechanism restores said locking member from a lock releasing position of said cylindrical member to a lock position thereof.

4. A spinning type fishing reel according to claim 1, wherein said changeover control mechanism includes an operating mechanism for causing said spool shaft to be non-rotatable with respect to said reel body and said reel further comprises a master gear for driving said rotary frame, and at least one kick member rotatably driven together with said master gear, and wherein said return mechanism comprises a contactor for operatively engaging said kick member, an actuator operative in response to operation of said contactor, and an interlocking means for operatively interlocking said actuator with said operating mechanism.

5. A spinning type fishing reel according to claim 1, further comprising a sub-drag mechanism, responsive to a changeover of said drag mechanism to said operation releasing state, for applying against free rotation of said spool a rotational resistance smaller than said resistance applied to said spool by said drag mechanism.

6. A spinning type fishing reel according to claim 5, wherein said drag mechanism is disposed between said spool and said spool shaft, said spool shaft is supported rotatably relative to said reel body, said changeover control mechanism comprises a lock mechanism having a locking member for locking rotation of said spool shaft with respect to said reel body and an operating mechanism for operating said lock mechanism, and said return mechanism restores said locking member from a lock releasing position of said spool shaft to a lock position thereof, and said sub-drag mechanism is disposed between a support member supporting said locking member and said reel body.

7. A spinning type fishing reel according to claim 6, wherein said spool shaft comprises said support member for supporting said locking member.

8. A spinning type fishing reel according to claim 5, wherein said spool shaft includes a cylindrical member supported rotatably with respect to said spool shaft, said drag mechanism is disposed between said spool shaft and said cylindrical member, said changeover control mechanism includes a lock mechanism having a locking member for locking rotation of said cylindrical member with respect to said spool shaft and an operating mechanism for operating said lock mechanism, and said return mechanism restores said locking member from a lock releasing position of said cylindrical member to a lock position thereof, and said sub-drag mechanism is disposed between said cylindrical member and said reel body.

9. A spinning-type fishing reel according to claim 1, further comprising a rotating member including a master gear for driving said rotary frame, and at least one kick member rotatably driven together with said rotating member, said changeover control mechanism including an operating mechanism for causing said spool shaft to be non-rotatable with respect to said reel body, and said return mechanism comprising a contactor, which operatively engages said kick member when said kick member is rotated with said rotating member, for actuating said operating mechanism to cause said spool shaft to be non-rotatable relative to said reel body responsive to rotation of said kick member with said rotating member, thereby to restore said changeover control mechanism from said condition causing said drag mechanism to occupy said operation releasing state to said condition causing said drag mechanism to occupy said operating state.

* * * * *